United States Patent [19]

Cohen et al.

[11] Patent Number: 4,820,016

[45] Date of Patent: Apr. 11, 1989

[54] WAVEGUIDE-CONTAINING COMMUNICATIONS AND SENSING SYSTEMS

[75] Inventors: Leonard G. Cohen, Berkeley Heights; John Hegarty, Summit, both of N.J.

[73] Assignee: American Telephone and Telegraph Company, AT&T Bell Laboratories, Murray Hill, N.J.

[21] Appl. No.: 832,457

[22] Filed: Feb. 21, 1986

[51] Int. Cl.$^4$ .............................. G02B 6/28; G02F 1/17
[52] U.S. Cl. .............................. 350/96.29; 350/96.16; 350/354
[58] Field of Search ............... 350/96.15, 96.29, 96.16, 350/354

[56] References Cited

U.S. PATENT DOCUMENTS

| | | | |
|---|---|---|---|
| 3,297,875 | 1/1967 | Garwin et al. | 350/96.29 X |
| 3,355,674 | 11/1967 | Hardy | 350/96.29 X |
| 3,521,070 | 7/1970 | Duguay et al. | 350/354 |
| 3,647,277 | 3/1972 | Kominow | 350/96.29 |
| 3,790,252 | 2/1974 | Pao | 350/354 |
| 4,136,929 | 1/1979 | Suzaki | 350/96.15 |
| 4,314,743 | 2/1982 | Rast | 350/354 |
| 4,319,186 | 3/1982 | Kingsley | 350/96.29 X |
| 4,382,660 | 5/1983 | Pratt, Jr. et al. | 350/354 X |
| 4,436,995 | 3/1984 | Whitten | 350/96.15 X |
| 4,618,211 | 10/1986 | Fleury | 350/96.15 |
| 4,699,452 | 10/1987 | Mollenauer et al. | 350/96.16 |

OTHER PUBLICATIONS

Stolen, R. H., "Nonlinear Properties of Optical Fibers", Optical Fiber Telecommunications, pp. 125–150 ISBN 0-12-49750-7 (1979).

*Primary Examiner*—John D. Lee
*Attorney, Agent, or Firm*—Bernard Tiegerman

[57] ABSTRACT

An optical system, including a waveguide such as an optical fiber, in which optical signals are noninvasively coupled into the waveguide at any point along the length of the waveguide, is disclosed. This is achieved by coupling substantially constant intensity electromagnetic radiation into the waveguide, and then impinging upon the waveguide a directed beam of energy, such as electromagnetic radiation or heat, from an energy source. Alternatively, the waveguide is impinged upon by a combination of an energy beam and a stimulus, e.g., a temperature change. The energy beam, or energy beam and stimulus, induce at least partial absorption of the guided, substantially constant intensity electromagnetic radiation by radiation-absorbing material in the waveguide, to produce the desired optical signal.

15 Claims, 4 Drawing Sheets (FIG. 5A)

WAVEGUIDE-CONTAINING COMMUNICATIONS AND SENSING SYSTEMS

BACKGROUND OF THE INVENTION

1. Field of the Invention

The invention pertains to communication and sensing systems which include waveguides, such as optical fibers.

2. Art Background

Waveguides are devices used for guiding electromagnetic radiation. Included among such devices are optical fibers, which typically include a core and a cladding, and are generally fabricated from silica. Because the core is conventionally fabricated to have a higher refractive index than the cladding, electromagnetic radiation is largely confined to, and guided by, the core through the phenomenon of total internal reflection.

Optical fibers are now being used, or have been proposed for use, in a wide variety of optical communication and sensing systems. In the former category, one of the most promising applications of optical fiber is in the role of an optical data bus linking the input/output (I/O) devices, e.g., computer terminals, of a local area network (LAN). (A LAN is a multiple-access communication system in which two or more I/O devices, such as computer terminals, are linked to a central processing unit and/or to each other through a data link.) That is, each I/O device of an optical fiber LAN includes an optical source and an optical detector for, respectively, generating and detecting optical signals, the optical fiber data bus serving to communicate these optical signals between the I/O devices.

An optical fiber LAN must necessarily include optical taps for tapping optical signals out of the optical fiber data bus and into each I/O device, and optical couplers for coupling optical signals from each I/O device into the optical fiber data bus. A variety of taps are now in use, including invasive taps (taps which require cutting into the optical fiber data bus) and noninvasive taps. The latter are generally preferred to avoid degrading the strength of the data bus. Exemplary noninvasive taps include one or more small bends (typically having a radius of curvature of several centimeters) in the optical fiber data bus, which results in optical signal power being radiated out of the data bus.

An exemplary, currently used optical coupler, useful both for coupling optical signals into, and for tapping optical signals out of, an optical fiber data bus includes two optical fibers 10 and 20 (see FIG. 1). Typically, the coupler is formed by excising a sufficiently large cladding portion from each of the two fibers so that when the resulting fiber surfaces are contacted, the two optical fiber cores are brought into relatively close proximity (to within a few core diameters or into contact). Then, the two cores are carefully aligned with each other to achieve a desired optical coupling efficiency by sliding the two optical fibers along their cut surfaces. Finally, the cut surfaces are fused together through, for example, a heat treatment. Coupling an optical signal from an I/O device into an optical fiber data bus is then achievable by cutting the optical fiber data bus, and splicing one of the fibers of the optical coupler, e.g., the optical fiber 10, into the cut portion of the data bus. That is, upon launching an optical signal from an I/O device into the optical fiber 20, a portion of the evanescent field associated with this optical signal will extend into, and be guided by, the core of the fiber 10, and thus be coupled into the core of the optical fiber data bus. (The evanescent field is the exponentially decaying portion of the electromagnetic radiation guided by an optical fiber which extends beyond the core, and into the cladding, of the fiber.)

While the above-described optical coupler is useful, it does have a number of drawbacks. For example, the process of joining the coupler to an optical fiber data bus is invasive, i.e., requires the bus to be cut, which necessarily degrades the physical integrity of the bus. In addition, the fabrication of the optical coupler (which, in use, becomes an integral part of the optical fiber data bus) effectively constitutes an additional step in the fabrication of the optical fiber data bus. As a consequence, the complexity, and cost, of manufacture of the optical fiber data bus is effectively and substantially increased. Moreover, the addition of each new user to a LAN involves the splicing of an optical coupler to the optical fiber data bus (a process typically performed after installation of the optical fiber data bus), which generally requires a service interruption. Significantly, the two splices involved in joining an optical coupler to an optical fiber data bus typically exhibit a combined optical loss of about 0.5 dB. In addition, a portion of any optical signal guided by the optical fiber data bus is necessarily coupled into each optical coupler (including those for which the signal is not intended), with each such coupling typically constituting a loss of about 0.5 dB. (There is also an additional loss associated with each optical coupler, also typically about 0.5 dB, which, as yet, is unexplained.) Thus the addition of each new user produces a significant, and cumulative, increase in loss. In fact, the splice, coupling, and other (as yet, unexplained) losses are so high that the total number of LAN users is typically limited to no more than about 20.

As noted, optical fibers have also been proposed for use in sensors. For example, one type of fiber, potentially useful as a distributed sensor (a sensor capable of detecting stimuli at a plurality of spaced points or regions), is a plastic clad silica (PCS) fiber. When used as a distributed sensor, a PCS fiber typically includes a silica core 30 (see FIG. 2) as well as a plastic cladding 40 containing distributed active centers such as neodymium or oxazine perchlorate. When subjected to an external stimulus, e.g., a change in ambient temperature or a change in the concentration of a chemical, the active centers respond by changing their optical absorption. Thus, by transmitting those wavelengths of electromagnetic radiation whose intensities are likely to be affected by this change in absorption, and by detecting the intensities of these wavelengths, the presence or absence of a stimulus is readily determined. Moreover, by reflecting these wavelengths back through the fiber to their point of origin, and using the conventional technique of optical time domain reflectometry (OTDR), the position of the stimulus along the length of the fiber is also readily determined. (Regarding OTDR see, e.g., M. Barnoski and S. Personick, "Measurements in Fiber Optics," *Proceedings of IEEE,* Vol. 66, No. 4, pp. 429–441 (1978).)

Although active center-doped PCS fibers are certainly useful as distributed sensors, they are limited in that their spatial resolution, i.e., their ability to resolve the spatial extent of a stimulus, is no better than about 50 meters. Consequently, the location of stimuli can only be determined to within about 50 meters. In addition, the OTDR apparatus is very expensive (typically costing between ten and twenty thousand dollars).

Thus, those engaged in the development of optical fiber systems have sought, thus far without success, optical fiber LANs in which the optical couplers are formed without degrading the physical integrity of the optical fiber data bus, without increasing the complexity of manufacture of the optical fiber data bus, without the need for loss-producing splices, and without service interruptions. In addition, the developers of optical fiber systems have also sought, thus far without success, optical fiber distributed sensors which are both relatively cheap and have spatial resolutions significantly smaller than about 50 meters.

SUMMARY OF THE INVENTION

The invention involves an optical system, including a waveguide, such as an optical fiber, in which optical signals are noninvasively coupled into the waveguide at any point along the length of the waveguide. The invention also involves a method for communicating information.

In addition to the waveguide, the inventive system includes an optical source which is capable of emitting electromagnetic radiation of substantially constant intensity. The waveguide is in optical communication with the optical source, and thus serves to guide at least a portion of the electromagnetic radiation emitted by the source.

Significantly, the waveguide includes material which absorbs at least a portion of the substantially cosntant intensity electromagnetic radiation guided by the waveguide. However, this absorption only occurs after the material absorbs energy, e.g., electromagnetic radiation (different from the guided radiation) or heat, from a directed beam of energy emitted by an energy source external to the waveguide. Alternatively, radiation absorption occurs in response to a combination of energy absorption and a stimulus, such as a change in ambient temperature or a change in chemical species concentration in the vicinity of the waveguide.

An optical signal is noninvasively coupled into the waveguide, in accordance with the invention, by coupling substantially constant intensity radiation from the optical source into the waveguide. The intensity of this radiation is then selectively reduced by selectively impinging the waveguide with a directed beam of energy, or a combination of an energy beam and a stimulus, to produce the desired optical signal.

In, for exampl, an optical fiber LAN embodiment of the inventive system, each I/O device included in the system itself includes an energy source. In addition, the optical fiber includes material which, after absorbing energy from a directed beam of energy emitted by any one of the energy sources, absorbs at least a portion of the substantially constant-intensity electromagnetic radiation guided by the optical fiber. By modulating the intensity of the energy beam emitted by its energy source, an I/O device is readily capable of producing an optical signal in the optical fiber, without the need for cutting the fiber, and without the need for loss-producing splices. Significantly, the radiation-absorbing fiber material is readily incorporated into the fiber during fabrication, without any significant increase in the cost or complexity of fiber manufacture.

In an optical fiber sensor embodiment of the inventive system, one or more energy sources are positioned at selected locations along the length of the fiber. The optical fiber again includes material which absorbs at least a portion of the guided electromagnetic radiation after absorbing energy from a directed energy beam emitted by any one of the energy sources. However, the degree of absorption is determined by the presence (or absence) and strength of an external stimulus. Alternatively, the material absorbs the guided radiation, but only after both absorbing energy from an energy beam and experiencing a stimulus. Thus, the presence of a stimulus (if it exists) corresponds to an altered decrease or, alternatively, just a decrease, in the intensity of the guided radiation. In addition, the location of the stimulus corresponds to the position of the fiber portion impinged by energy from an energy source. Significantly, the achievable spatial resolution is just the width of the energy beam emitted by the energy source, which is readily made smaller than a centimeter, and even smaller than a millimeter. Moreover, the absence of OTDR equipment makes the inventive sensor relatively cheap.

BRIEF DESCRIPTION OF THE DRAWINGS

The invention is described with reference to the accompanying drawings, wherein.

DETAILED DESCRIPTION

As discussed, the invention involves a system, including a waveguide, e.g., an optical fiber, in which optical signals are noninvasively coupled into the waveguide at any point along the length of the waveguide. The invention also involves a method for communicating information.

In accordance with the inventive communication method, substantially constant intensity electromagnetic radiation is directed into a medium which is at least partially transparent to the radiation e.g., a waveguide, and includes radiation-absorbing material. Information is then superimposed upon the radiation by impinging upon the medium a directed energy beam, or a combination of an energy beam and a stimulus, which induces at least partial absorption of the radiation by the material. For example, and in accordance with the inventive method, an optical signal is produced within an optical fiber by coupling substantially constant intensity electromagnetic radiation into the fiber, and then impinging upon the fiber a directed energy beam from an energy source external to the fiber, or a combination of an energy beam and a stimulus. The energy beam, or energy beam and stimulus, serve to induce at least partial absorption of the electromagnetic radiation by material in the fiber, to produce the desired signal.

Figure 1:
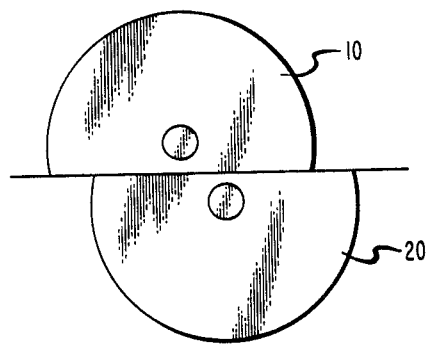
FIG. 1 is a cross-sectional view of a conventional optical coupler.
Figure 2:
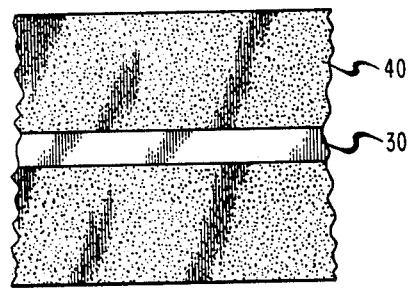
FIG. 2 is a cross-sectional view of a doped, plastic clad silica fiber, useful as a distributed sensor.
Figure 3:
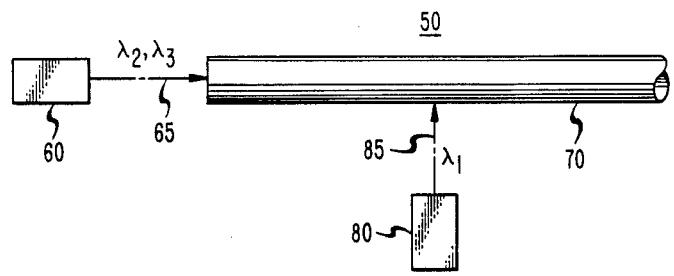
FIG. 3 is a schematic diagram of the inventive optical system.

With reference to FIG. 3, the inventive system 50 includes an optical source 60 which is capable of emitting electromagnetic radiation 65 of substantially constant intensity, e.g., a c-w laser. (For purposes of the invention, the term substantially constant intensity means that any deviation in the intensity of the radiation 65 emitted by the source 60 from the time-average intensity (averaged over the time that optical signals within the waveguide, described below, are to be detected), is equal to or less than about one percent of the time-average intensity.) The system 50 also includes a waveguide 70 which, for purposes of illustration, 8 is hereafter assumed to be an optical fiber. The fiber 70 is in optical communication with the source 60, and is thus capable of guiding at least a portion of the emitted radiation 65. This optical communication is achieved, for example, by aligning the source 60 with one end of the optical fiber 70, and directing the electromagnetic radiation 65 into the fiber 70. Alternatively, if, for example, the optical fiber 70 is a closed fiber loop, then optical communication is achieved through expedients such as a conventional optical coupler.

In accordance with a first embodiment of the invention, the system 50 constitutes a LAN which, in addition to the source 60 and fiber 70, further includes two or more I/O devices 90 (not shown), i.e., devices which are capable of generating and receiving signals. Such devices include, for example, computers, computer terminals, and optoelectronic device components. (An optoelectronic device is one which produces an optical output in response to an electrical input, or vice versa, e.g., a semiconductor laser.) Significantly, each I/O device 90 includes a source 80 (shown in FIG. 3) of energy, e.g., electromagnetic radiation (different from the electromagnetic radiation 65) or heat, which is capable of impinging a directed beam 85 of such energy upon a selected portion of the optical fiber 70. In addition, the optical fiber 70 includes material which is capable of absorbing at least a portion of the guided electromagnetic radiation 65, but only after being impinged upon by, and absorbing energy from, an energy beam 85. This material is either contained in selected portions of the optical fiber 70, accessible to the energy beams 85, or is distributed throughout the entire length of the fiber 70. As a consequence, each I/O device is capable of modulating the intensity of the guided electromagnetic radiation 65, to produce an optical signal guided by the fiber 70, by impinging a portion of the optical fiber 70 with an energy beam 85 whose intensity is correspondingly modulated. Such an optical signal is detected by the other I/O devices using, for example, conventional noninvasive optical taps and conventional optical detectors.

In a second embodiment of the invention, the system 50 constitutes a sensor which, in addition to the source 60 and optical fiber 70, includes one or more of the energy sources 80, positioned at selected locations along the length of the fiber 70. In this embodiment, the optical fiber 70 includes material which absorbs at least a portion of the guided electromagnetic radiation 65 after being impinged upon by, and absorbing energy from, one of the directed energy beams 85. However, the degree of absorption is determined by the presence (or absence) and strength of a stimulus. (A stimulus, for purposes of the invention, is any change in the environment surrounding the fiber 70 which alters the optical absorption properties of the radiation-absorbing material.) Such a stimulus is, for example, a change in ambient temperature, a change in an applied stress such as ambient pressure, or a change in the concentration of a substance in the vicinity of the fiber. Alternatively, absorption of the guided radiation 65 only occurs in response to absorption of energy from an energy beam 85 and an external stimulus. Thus, both the presence, and location, of a stimulus is readily detected by, for example, sequentially energizing the energy sources 80 (whose positions along the length of the fiber 70 are known), and detecting the intensity of the guided electromagnetic radiation 65. An altered decrease in intensity or, alternatively, just a decrease in intensity (depending on the nature of the radiationabsorbing material), produced by turning on a particular energy source 80 would, of course, indicate the presence of a stimulus at the location of that energy source. Because available, useful energy sources 80, such as lasers, produce energy beams 85 having widths smaller than a centimeter, and even smaller than a millimeter, the position of the stimulus along the length of the fiber 70 is readily determined to within a centimeter, or even a millimeter, or less.

In the above two embodiments of the system 50, the intensity of the guided radiation 65 is either partially reduced, or reduced to essentially zero, through induced absorption. However, there are other embodiments in which the guided radiation is preferably switched off, i.e., the intensity is reduced to essentially zero. For example, in a third embodiment of the invention, a first fiber is in optical communication with a second and a third fiber, i.e., electromagnetic radiation guided by, and emanating from, the first fiber is communicated to the second and third fibers. In this third embodiment, the latter fibers contain sufficient radiation-absorbing material so that if either fiber is subjected to a directed energy beam (of sufficient power), or a combination of an energy beam and a stimulus, the intensity of the electromagnetic radiation guided by that fiber is reduced to essentially zero. Thus, for example, an optical signal guided by the first fiber will be communicated to both the second and third fibers, but will only be guided by a selected one of the remaining fibers.

The radiation-absorbing materials useful in the invention are chosen to have specific energy levels, e.g., electronic energy levels. For example, if the radiation-absorbing material is to absorb electromagnetic radiation 65 after absorbing energy from an energy beam 85, then this material is chosen to have at least three energy levels, here denoted $E_1$, $E_2$, and $E_3$ (see FIG. 4(a)). If the optical source 60 and energy sources 80 are not being operated, then only the first energy leel, $E_1$, should be populated at the operating temperature of the system 50. In addition, the energy gap between $E_2$ and $E_1$ is chosen so that $E_2$ is only populated, i.e., material in energy level $E_1$ is promoted into energy level $E_2$, through absorption of energy from an energy beam 85. Further, the energy gap between $E_3$ and $E_2$ is chosen so that material in $E_2$ is only promoted into $E_3$ through absorption of energy from the guided radiation 65. Thus, for example, if the guided electromagnetic radiation 65 is of wavelength $\lambda_2$, and the energy beams 85 are beams of electromagnetic radiation of wavelength $\lambda_1$, then the energy levels are chosen so that material is promoted from $E_1$ into $E_2$ through absorption of electromagnetic radiation of wavelength $\lambda_1$, and excited material in $E_2$ is only promoted into $E_3$ through absorption of electromagnetic radiation of wavelength $\lambda_2$.

The degree of absorption of the guided electromagnetic radiation 65 is determined, in part, by the lifetime of the excited material in energy level $E_2$, i.e., the longer the lifetime, the greater the absorption, and vice versa. This lifetime is, in many instances, affected, e.g., reduced, through the influence of a stimulus such as a temperature change. Thus, if the guided electromagnetic radiation 65 is to be absorbed in response to energy from an energy beam 85, and the degree of absorption is to be determined by the presence (or absence) and strength of a stimulus, then the radiation-absorbing material is chosen to have a lifetime in $E_2$ which is altered by the presence of the stimulus, with the strength of the stimulus determining the degree of alteration.

Figure 4:
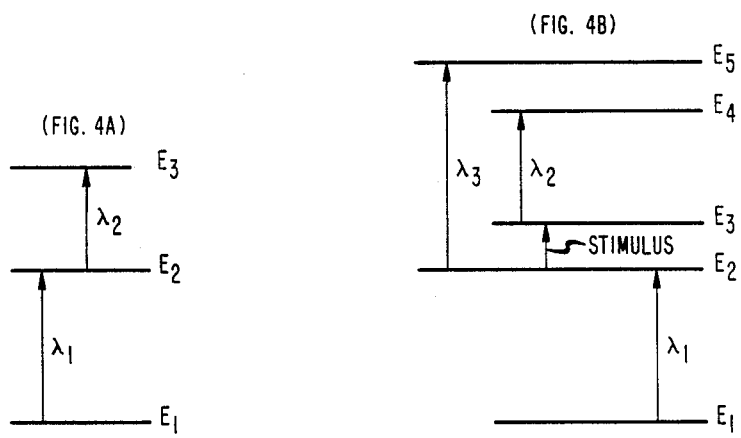
FIGS. 4A and 4B depict the energy-levels of the radiation-absorbing materials usefule in the invention.

If the radiation-absorbing material is to absorb the guided radiation 65 only in response to both an energy beam and a stimulus, then the material is chosen to have at least four, and preferably five, energy levels, denoted $E_1$, $E_2$, $E_3$, $E_4$ and $E_5$ (see FIG. 4(b)). As before, and when the optical source 60 and energy sources 80 are not in operation, and there is no stimulus (the stimulus to be detected), then only the first energy level, $E_1$, should be populated at the operating temperature of the system 50. In addition, the second energy level, $E_2$, is chosen so that material in $E_1$ is promoted into $E_2$ through absorption of energy from an energy beam 85. Further, the third energy level, $E_3$, is chosen so that the stimulus promotes, e.g., redistributes, material in $E_2$ into $E_3$ (and, perhaps, other energy levels). Finally, the fourth energy level, $E_4$, is chosen so that material in $E_3$ is promoted into $E_4$ through absorption of the guided electromagnetic radiation 65. Thus, for example, if an energy source 80 emits electromagnetic radiation of wavelength $\lambda_1$ and the optical source 60 emits electromagnetic radiation of wavelength $\lambda_2$, then $E_4$ will be populated through absorption of electromagnetic radiation of wavelength $\lambda_2$ only after the levels $E_2$ and $E_3$ are populated through, respectively, absorption of electromagnetic radiation of wavelength $\lambda_1$ and the effect of the stimulus.

The degree of absorption of the guided electromagnetic radiation of wavelength $\lambda_2$, by materials having the energy levels depicted in FIG. 4(b), is determined by the population in energy level $E_3$, which in turn is determined by the population in energy level $E_2$. But the latter population is, in some instances, affected by stimuli other than the stimulus of interest, e.g., the other stimuli may reduce the lifetime of the excited material in $E_2$, resulting in a reduced absorption of electromagnetic radiation of wavelength $\lambda_2$. To avoid the effects of the unwanted stimuli, the guided electromagnetic radiation 65 preferably includes at least two different wavelengths, i.e., $\lambda_2$ and $\lambda_3$. Further, the fifth energy level $E_5$ (see FIG. 4(b)) is chosen so that excited material in $E_2$ is promoted into $E_5$ through absorption of radiation of wavelength $\lambda_3$. But this absorption (determined by the population in $E_2$) is as much affected by the unwanted stimuli as is the absorption of the electromagnetic radiation of wavelength $\lambda_2$. Thus, by detecting the absorptions at both wavelengths, and by taking the ratio of these absorptions, the influence of the stimulus of interest is readily isolated.

A wide-variety of radiation-absorbing materials are useful in the invention, i.e., exhibit energy levels, such as electronic energy levels, of the type described above, even after incorporation into an optical fiber. Included among these are the elements having partially filled d or f electronic orbitals, and preferably partially filled 3d or 4f electronic orbitals, e.g., the rare earth elements. (Regarding the energy level structures of the rare earths, see, e.g., G. H. Dieke, *Spectra and Energy Levels of Rare Earth Ions in Crystals* (Wiley Interscience, New York, 1968).) Other useful materials include organic dyes such as Rhodamine 6G (sold by the Exciton Corporation of Dayton, Ohio).

When incorporating an element, of the type described above, into, for example, a glass fiber, the element is typically incorporated in ionic form, i.e., as an ion bonded to a ligand, with the nature of the bonding ranging from pure ionic bonding to covalent bonding. For example, when incorporating a rare earth element, such as cerium (Ce) or neodymium (Nd), into an optical fiber which includes silica glass, the Ce or Nd is readily incorporated into the silica glass, in ionic form, as cerium oxide ($Ce_2O_3$) or neodymium oxide ($Nd_2O_3$), i.e., as $Ce^{3+}$ or $Nd^{3+}$ bonded to oxygens.

The radiation-absorbing materials discussed above absorb different wavelengths of electromagnetic radiation, and respond to different stimuli. For example, $Ce^{3+}$ readily absorbs (substantially constant intensity) electromagnetic radiation having a wavelength of, for example, 0.514 μm (the argon laser line), after absorbing electromagnetic radiation of wavelength 0.337 μm (nitrogen laser line). In addition, the degree to which the former absorption occurs is altered by stimuli such as a temperature change or a strainin the optical fiber produced, for example, by a stress applied to the fiber or a change in atmospheric pressure. Moreover, the $Nd^{3+}$ readily absorbs electromagnetic radiation of wavelength 1.06 μm, after both absorbing electromagnetic radiation of wavelength 0.9 μm and experiencing a stimulus such as a temperature change or a strain in the fiber. Further, Rhodamine 6G absorbs electromagnetic radiation of wavelength equal to 0.43 μm after absorbing electromagnetic radiation of wavelength equal to 0.53 μm. Significantly, the lifetime of the excited state produced by the latter absorption is altered, e.g., reduced, by the presence of chemicals such as oxazine perchlorate.

The incorporation of a rare earth element, such as cerium, into, for example, a silica fiber, is readily achieved during the fabrication of the fiber. For example, if the fiber is fabricated using the modified chemical vapor deposition (MCVD) method, then silicon tetrachloride and oxygen gas streams are flowed into a reaction zone where they react to form silica, which is deposited onto an inner surface of an optical fiber preform. By also flowing cerium trichloride into the reaction zone (a step which adds little or nothing to the cost or complexity of fiber manufacture), the cerium trichloride reacts with the oxygen to form cerium oxide, which is also depositd onto the preform. (Regarding this incorporation procedure see co-assigned U.S. patent application Ser. No. 699,669 filed by J. B. MacChesney and J. R. Simpson on Feb. 8, 1985, now U.S. Pat. No. 4,666,247, which is hereby incorporated by reference.)

A variety of optical fiber materials containing one or more of the above-described radiation absorbing materials, as well as a variety of optical fiber configurations, are useful in the invention. For example, an optical fiber having a single, central core 90 of silica, surrounded by a single, lower-refractive-index cladding 100 of silica (see FIG. 5(a)), with a radiation-absorbing material distributed through either the core or the cladding, is certainly usefule.

Another useful optical fiber configuration includes a core 90 of, for example, silica, and a plastic cladding 100 containing a radiation-absorbing material. Included among the useful plastic cladding materials is, for example, poly(methyl methacrylate) (PMMA). Because PMMA is commercially sold in liquid form, i.e., the PMMA is dissolved in a solvent, a radiation-absorbing material such as Rhodamine 6G is readily added to the PMMA simply by adding the organic material to the liquid (assuming, of course, the organic material is dissolved by the solvent). After removing the solvent, the Rhodamine 6G-containing PMMA is readily extruded into the desired shape of the cladding 100 using conventional techniques (see, e.g., the techniques described in *Optical Fiber Communications*, Vol. 1, "Fiber Fabrication", edited by T. Li, Academic Press, 1985, Chapter 4, pp. 179–248).

Still another useful optical fiber configuration includes a liquid core 90, i.e., the core 90 includes liquid which is at least partially transparent to the electromagnetic radiation 65 of interest, and a solid cladding 100, e.g., a silica cladding. Useful liquids include, for example, alcohol. In this configuration, the radiation-absorbing material is preferably distributed throughout the liquid core e.g., Rhodamine 6G is dissolved in the alcohol.

Figure 5:
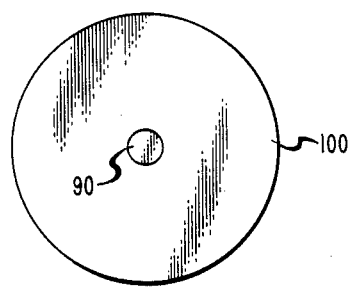
FIGS. 5A-5C depict optical fiber configurations useful in the invention.
Figure 5:
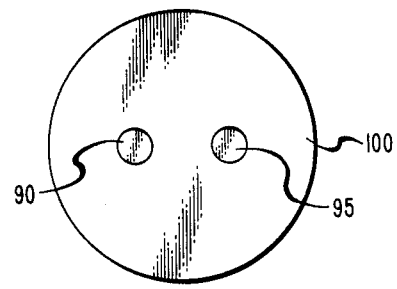
Figure 5:
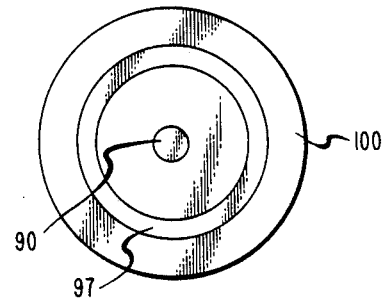

Yet another optical fiber configuration useful in the invention is depicted in FIG. 5(b), and includes two (or more) cores 90 and 95 and a cladding 100. Here, only one of the cores, e.g., the core 90, guides the electromagnetic radiation 65. Significantly, the radiation-absorbing material is distributed in the other core, e.g., the core 95. Moreover, the core 95 is placed sufficiently close to the core 90 so that the evanescent field extending from the electromagnetic radiation guided by the core 90 extends into the core 95. As a consequence, the intensity of the electromagnetic radiation guided by the core 90 is readily reduced by impinging the core 95 with an energy beam from an energy source 80.

Yet still another useful optical fiber configuration is depicted in FIG. 5(c) and includes a core 90 and a cladding 100. Here, the radiation-absorbing material is contained in an annulus 97 encircling the core 90.

Different users of the different embodiments of the inventive system 50 generally have different goals and/or are subject to different limitations, and thus impose different system requirements on the inventive embodiments. In what follows, procedures are described for choosing useful radiation-absorbing materials, and concentrations of these materials, in relation to typical system specifications and/or limitations.

In the case of, for example, an optical fiber LAN, a minimum bit rate (MBR) is generally specified for the LAN. In addition, a commercially available optical fiber is typically employed in the LAN and thus fiber material and fiber loss are also specified. In conjunction with the choice of the fiber, a commercially available optical source which emits electromagnetic radiation of a wavelength, $\lambda_2$, transmitted and guided by the optical fiber, is typically specified. Further, commercially available detectors (incorporated into the I/O devices), for detecting the intensity, or intensity changes, of the guided electromagnetic radiation, are also typically specified. Moreover, it seems likely that commercially available energy sources, such as commercially available lasers emitting electromagnetic radiation of wavelength $\lambda_1$, will be specified in commercial embodiments of the inventive LAN.

The first step in choosing a radiation-absorbing material useful in the inventive optical fiber LAN, and subject to the above system specifications and/or limitations, is to choose a plurality of materials having the three energy levels, e.g., electronic energy levels, depicted in FIG. 4(a). These materials should be chosen from among those which can be incorporated into the optical fiber of the LAN (as determined, for example, by incorporating these materials into control samples of the optical fiber).

To achieve readily detectable absorption of the electromagnetic radiation of wavelength $\lambda_2$, a significant portion, e.g., at least 10 percent, of the electromagnetic radiation of wavelength $\lambda_1$ should be absorbed by the radiation-absorbing material. The degree to which the latter absorption occurs is determined both by $\sigma_{12}$, the matreial cross-section for absorption of radiation of wavelength $\lambda_1$ (i.e., the cross-section for promotion from energy level $E_1$ to energy level $E_2$ [see FIG. 4(a)]), and the concentration of the material in the optical fiber. Consequently, to achieve the 10 percent absorption requirement, candidates should be chosen (from among the plurality chosen above) having relatively high $\sigma_{12}$s. (Absorption cross-sections are to be found throughout the literature including, for example, in Dieke, supra.) The concentrations of the candidates, having relatively high cross-sections, needed to achieve the 10 percent absorption requirement is then determined empirically, e.g., by incorporating different concentrations of these candidates into control samples of the optical fiber, and measuring the resulting degree of absorption of radiation of wavelength $\lambda_1$.

To achieve the specified minimum bit rate, MBR, the lifetime, $\tau_2$, of the (ultimately chosen) radiation-absorbing material in energy level $E_2$ should be less than or equal to 1/MBR. Because radiation-absorbing materials typically undergo radiative relaxation from $E_2$ to $E_1$, i.e., they fluoresce during relaxation, the lifetimes of the candidate is readily measured by measuring their fluorescence lifetimes (using conventional techniques). Significantly, the lifetimes, $\tau_2$, of these materials is determined both by their intrinsic lifetimes and by their concentrations (increasing the concentration often reduces $\tau_2$). Consequently, the lifetimes, $\tau_2$, of the potential candidates should be measured at the concentration levels which permit the 10 percent absorption criterion to be met. If one or more of the potential candidates has too long a lifetime, i.e., $\tau_2 > 1/MBR$, then this lifetime is often readily reduced by, for example, increasing concentration.

To achieve a readily detectable absorption of the electromagnetic radiation of wavelength $\lambda_2$, the lifetime, $\tau_2$, of the radiation-absorbing materials in energy level $E_2$ should be greater than or equal to about 0.1/MBR. Because increases in concentration often serve to reduce $\tau_2$, this additional limitation on $\tau_2$ limits concentration, and thus further limits the potentially useful candidates.

Having eliminated the candidates which fail to meet the above requirements, the degree of absorption of electromagnetic radiation of wavelength $\lambda_2$ produced by the remaining candidates is measured. IF no remaining candidate produces an absorption of radiation of wavelength $\tau_2$, which is detectable over a distance corresponding to the widest separation between any two I/O devices, then a variety of options are available. For example, a different detector, having a higher sensitivity, may permit absorption detection. Alternatively, higher power energy sources (emitting electromagnetic radiation of wavelength $\lambda_1$) may be necessary. If none of these expedients works, then the underlying system specifications, e.g., the optical fiber and the wavelengths $\lambda_1$ and $\lambda_2$, will have to be changed.

In the case of an optical fiber LAN in which, for example, (1) the optical fiber 70 (see FIG. 3) is of silica, (2) the optical source 60 is a conventional argon laser producing electromagnetic radiation of wavelength 0.514 μm, (3) the energy sources 80 are conventional nitrogen lasers producing electromagnetic radiation of wavelength 0.337 μm, (4) the detectors (included in the I/O devices 90) are conventional IR detectors such as doped silicon PIN or APD detectors, and (5) the minimum bit rate is, for example, 10 megabits per second, then the useful radiation-absorbing materials, as determined using the above procedure, include $Ce^{3+}$. In addition, if uniformly distributed throughout the fiber core, then the concentration of the $Ce^{3+}$ ranges from about 0.1 mole percent to about 1 mole percent. Concentrations less than about 0.1 mole percent are undesirable because this results in an undesirably small absorption of the 0.337 μm radiation, and consequently an undesirably small absorption of the 0.514 μm radiation. Concentrations greater than about 1 mole percent are undesirable because only the $Ce^{3+}$ ions near the core-/cladding interface absorb the 0.337 μm radiation, resulting in an undesirably small overlap between the excited $Ce^{3+}$ ions and the guided 0.514 μm radiation, and thus an undesirably small and nonuniform absorption of the guided radiation.

In the case of the inventive optical fiber sensor, it is believed that commercial embodiments of the sensor will likely employ commercially available optical fiber, and thus the fiber material and fiber loss will be specified. It is also believed that a commercially available optical source, emitting specified electromagnetic radiation of wavelength $\lambda_2$ (and perhaps $\lambda_3$), as well as a commercially available detector (for detecting changes in the intensity of the specified radiation), having a specified sensitivity, will also be employed. Further, commercially available energy sources, e.g., commercially available lasers emitting electromagnetic radiation of wavelength $\lambda_1$, will likely be employed. Against this background, the particular stimulus to be detected, the stimulus range, and the desired stimulus resolution, will also be specified. For example, if changes in ambient temperature (the stimulus are to be detected, then it will likely be specified that such changes be detectable over a particular temperature range (the stimulus range), e.g., 1 to 1000 degrees Kelvin (°K.), and that temperature changes as small as, for example, 0.1° K. (the resolution), be detectable over the entire temperature range.

If the sensor is to employ a radiation-absorbing material having the energy level structure depicted in FIG. 4(a), then potential candidates should be chosen from among materials which can be incorporated into the specified optical fiber, and have energy levels $E_2$ and $E_3$ populated, respectively, through absorption of, for example, electromagnetic radiation of wavelengths $\lambda_1$ and $\lambda_2$. The potential candidates should then be narrowed by eliminating those which do not have relatively high values of $\tau_{12}$. The concentrations of the remaining candidates needed to achieve at least 10 percent absorption of the electromagnetic radiation of wavelength $\lambda_1$ is then determined, as discussed above.

The second step is to eliminate those candidates whose lifetimes in energy level $E_2$ (as determined, for example, from measurements of their fluorescence lifetimes) are unaffected by the stimulus of interest, over the specified stimulus range.

The third step is to determine which of the remaining candidates produces an absorption of the electromagnetic radiation of wavelength $\lambda_2$, at one end of the fiber, which is detectable at the opposite fiber end, in response to a stimulus having the desired resolution, over the entire stimulus range. If no such candidate exists, then, for example, it may be necessary to employ higher power energy sources, a more sensitive detector, or different wavelengths $\lambda_1$ and $\lambda_2$.

If the sensor is to employ a radiation-absorbing material having the energy level structure depicted in FIG. 4(b), then potential candidates are chosen from among the materials which can be incorporated into the specified fiber, have an energy level $E_2$ populated through absorption of electromagnetic radiation of wavelength $\lambda_1$, and have relatively high $\tau_{12}$s. The concentrations of these candidates, needed to achieve at least 10 percent absorption of the electromagnetic radiation of wavelength $\lambda_1$, is then determined, as discussed above.

The next step is to narrow the candidates to those having an energy level $E_3$ which is populated through the influence of the stimulus of interest, over the entire stimulus range. Because the potentially useful candidates typically relax radiatively from $E_3$ to $E_2$ and from $E_2$ to $E_1$, such candidates are readily detected from among those which exhibit changes in the wavelengths of their fluorescence.

The last step is to determine which of the remaining candidates produces an absorption of the electromagnetic radiation of wavelength $\lambda_2$ in response to a stimulus at one end of the fiber, which is detectable at the opposite fiber end. The magnitude of the stimulus should be equal to the desired resolution, and the resulting absorption should be detectable over the entire stimulus range.

If none of the candidates satisfies the above requirements, then it may be necessary, for example, to increase concentration, choose energy sources of greater power, or choose new candidates.

EXAMPLE

An optical fiber, which includes a single, central, silica core containing $Ce^{3+}$ at a concentration of about 0.1 mole percent, and a silica cladding, were fabricated using the procedure described in U.S. patent application Ser. No. 699,669, filed by J. B. MacChesney and J. R. Simpson on Feb. 8, 1985, now U.S. Pat. No. 4,666,247. That is, initially the silica cladding of an optical fiber preform was fabricated by flowing (gaseous) $SiCl_4$, $SiF_4$ and $O_2$ into a waveguide-grade (WGT08) silica support tube purchased from the Heraeus-Amersil Corporation of Sayreville, N.J. The support tube had an inner diameter of 13.5 millimeters (mm), an outer diameter of 16 mm, and a length of about 0.5 meters. The flow rates of the three gases were, respectively, 395 cubic centimeters per minute (cc/min), 75 cc/min and 2,282 cc/min. While flowing these gases into the support tube, an oxy-hydrogen torch was passed (from left to right) over the support tube, five times, at a traversal rate of about 18 centimeters per minute. As is known, the torch serves to produce a zone in the support tube in which the three gases react to form silica particles, which are thermophoretically deposited onto the inner surface of the tube, where they are consolidated (sintered). Based on optical pyrometric measurements of the surface temperature of the support tube, it is believed that the deposition temperature was about 1800 degrees Centigrade (°C.).

The $Ce^{3+}$-doped silica core of the optical fiber preform was formed by flowing two sets of gases, via two different flow paths, into the support tube. The first set of gases included $SiCl_4$ and $O_2$. The flow rates of these gases were, respectively, 41 cc/min and 1250 cc/min. The second set of gases included $AlCl_3$ and He, which were flowed into the support tube via a delivery tube containing about 0.75 grams of $MgCl_3$ and about 0.75 grams of $CeCl_3$, heated to a temperature of about 1100° C. The flow rate of the $AlCl_3$ was 17 cc/min, while that of the He was 450 cc/min. While flowing these two sets of gases into the support tube, the oxy-hydrogen torch was passed (from left to right) 10 times over the support tube, at a traversal rate of 18 centimeters per minute.

The optical fiber preform was collapsed through four additional passes of the oxy-hydrogen torch over the support tube. During these passes, a hotter torch flame was used to produce a temperature of about 2000° C. at the support tube surface. The core and cladding of the collapsed fiber preform had diameters of, respectively, 1.6 mm and 3.7 mm.

After collapse, the optical fiber preform was pulled to produce an optical fiber hundreds of meters in length, the resulting core and cladding having diameters of, respectively, 12 micrometers ($\mu m$) and 120 $\mu m$. During the pulling, a 2-mil thick coating of plastic, i.e., UV-curable urethane acrylate, was applied to the fiber, and cured with UV light. Then, a 3-meter length of fiber was excised (from the pulled fiber), to produce the optical fiber of interest.

A one-inch length of the plastic coating encircling the (3-meter-long) fiber, spaced about 10 cm from one end of the fiber, was removed by dipping this coating portion into hot sulfuric acid. An optical signal was then coupled into the fiber, via the one-inch length of exposed fiber, as described below.

Substantially constant intensity laser light, of wavelength equal to 0.514 $\mu m$, emitted by an argon ion CW laser purchased from the Coherent Corporation of Palo Alto, Calif., was focused into the end of the optical fiber adjacent the exposed fiber portion, using a conventional microscope lens. The CW laser produced about 1 milliwatt of power. The 0.514 $\mu m$ light transmitted by the fiber to the opposite fiber end was also focused by a microscope lens onto a silicon diode photodetector (Model FND 100), purchased from the EGG Corporation of Salem, Mass.. The output of the detector was displayed on a conventional oscilloscope.

The energy source used to induce absorption of the 0.514 $\mu m$ light was a pulsed nitrogen laser (Model UV14), purchased from Molectron Corporation of Sunnyvale, Calif., which emitted laser light of wavelength equal to 0.337 $\mu m$. Each of the light pulses emitted by this laser had a duration of about 10 nanoseconds (nsec) and contained about 1 microjoule of energy. The emitted light, which was rectangular in cross-section, was focused to a one-inch line onto the exposed fiber portion using a four-inch focal-length cylindrical lens.

Figure 6:
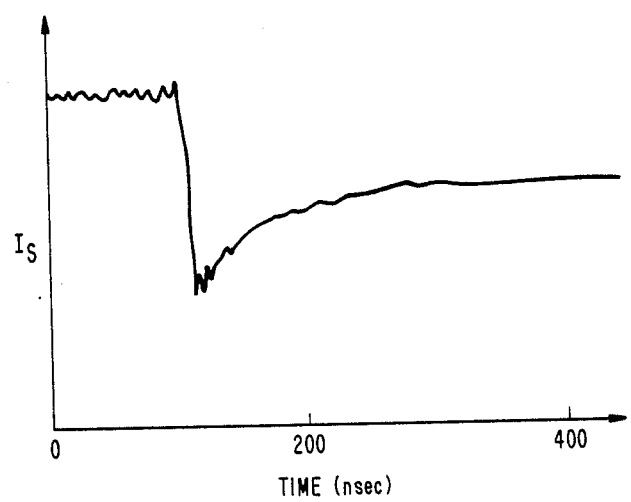
FIG. 6 depicts a measured optical signal produced in one embodiment of the invention.

The time course of the change in intensity ($I_s$) of the 0.514 $\mu m$ light, produced by a pulse of 0.337 $\mu m$ light, is displayed in FIG. 6. Analysis of this time course indicates that the intensity initially recovers with a 40 nsec lifetime, corresponding to the lifetime of the excited $Ce^{3+}$. In addition, there is a component having a lifetime of about 1 microsecond ($\mu sec$) which, it is believed, is due to the generation of excited complexes, e.g., color centers, in the fiber. On the basis of previous experiments, it is known that the 1-$\mu sec$ component is readily largely eliminated by reducing the intensity of the 0.337 $\mu m$ light. While the resulting change in intensity of the 0.514 $\mu m$ light is smaller than that shown in FIG. 6, it is still readily detected.

What is claimed is:

1. A system, comprising:
   a source of electromagnetic radiation; and
   a waveguide including an interior, a first surface defining a boundary between said interior and the exterior of said waveguide, and means for receiving electromagnetic radiation to be guided by said waveguide into said interior, said means including a second surface, said source being in optical communication with said second surface and said waveguide being capable of guiding at least a portion of the electromagnetic radiation emitted by said source, characterized in that
   the intensity of the electromagnetic radiation emitted by said source is substantially constant,
   said system further comprises a source of energy which is capable of directing a beam of energy at at least a portion of said first surface, and
   said waveguide includes means for reducing the intensity of the electromagnetic radiation guided by said waveguide in response to energy from said directed energy beam or a combination of energy from said energy beam and a stimulus.

2. The system of claim 1 wherein said waveguide includes on optical fiber.

3. The system of claim 2 wherein said optical fiber includes first and second ends, said receiving means including said first end.

4. The system of claim 2 wherein said optical fiber is a closed fiber loop, and said receiving means includes an optical coupler.

5. The system of claim 1 wherein said intensity reducing means includes material exhibiting at least first, second, and third energy levels, the energy from said energy beam promoting said material from said first to said second energy level, from which said material is promoted to said third energy level by absorption of electromagnetic radiation guided by said waveguide.

6. The system of claim 1 wherein said intensity reducing means includes material exhibiting at least first, second, third, and fourth energy levels, the energy from said energy beam promoting said material from said first to said second energy level, said stimulus promoting said material from said second to said third energy level, from which said material is promoted to said fourth energy level by absorption of electromagnetic radiation guided by said waveguide.

7. The system of claim 1 wherein said system includes an input/output (I/O) device which includes said source of energy.

8. The system of claim 7 wherein said I/O device includes a computer.

9. The system of claim 7 wherein said I/O device includes a computer terminal.

10. The system of claim 7 wherein said I/O device includes an optoelectronic device component.

11. The system of claim 1 wherein said stimulus includes a change in ambient temperature.

12. The system of claim 1 wherein said stimulus includes a change in applied stress.

13. The system of claim 12 wherein said applied stress includes ambient pressure.

14. The system of claim 1 wherein said stimulus includes a change in the concentration of a substance.

15. A method for communicating information, comprising the steps of:
   directing electromagnetic radiation into a medium which is at least partially transparent to said radiation, characterized in that
   said radiation has a substantially constant intensity,
   said medium includes material capable of absorbing said radiation, and
   said method further comprises the step of subjecting at least a portion of said medium to a directed, modulated beam of energy, the beam modulation representing information, or a combination of an energy beam and a stimulus, to induce at least partial absorption of said radiation by at least a portion of said material, which absorption is either modulated in accordance with the beam modulation or is indicative of the presence of said stimulus, said energy beam entering said medium via a first surface and said radiation entering said medium via a second surface.

* * * * *